United States Patent
Fischmann T.

(10) Patent No.: US 8,518,269 B2
(45) Date of Patent: Aug. 27, 2013

(54) METHOD AND SYSTEM FOR TREATING WATER USED FOR INDUSTRIAL PURPOSES

(75) Inventor: Fernando Fischmann T., Santiago (CL)

(73) Assignee: Crystal Lagoons (Curacao) B.V., Curacao (NL)

( * ) Notice: Subject to any disclaimer, the term of this patent is extended or adjusted under 35 U.S.C. 154(b) by 0 days.

(21) Appl. No.: 13/136,474

(22) Filed: Aug. 1, 2011

(65) Prior Publication Data

US 2012/0024794 A1    Feb. 2, 2012

Related U.S. Application Data

(60) Provisional application No. 61/469,537, filed on Mar. 30, 2011.

(51) Int. Cl.
   *C02F 1/72*    (2006.01)
(52) U.S. Cl.
   USPC .... 210/742; 210/721; 210/747.9; 210/170.09
(58) Field of Classification Search
   None
   See application file for complete search history.

(56) References Cited

U.S. PATENT DOCUMENTS

| | | | |
|---|---|---|---|
| 2,071,520 A | 2/1937 | Harrison |
| 2,141,811 A | 12/1938 | Everson |
| 2,314,767 A | 3/1943 | Burrell |
| 2,646,889 A | 7/1953 | August |
| 2,923,954 A | 2/1960 | Babcock |
| 3,317,925 A | 5/1967 | Vance |
| 3,412,862 A | 11/1968 | Chaplin |
| 3,406,416 A | 12/1968 | Presby et al. |
| 3,419,916 A | 1/1969 | Schankler |
| 3,470,091 A | 9/1969 | Budd et al. |
| 3,540,274 A | 11/1970 | Shore |
| 3,641,594 A | 2/1972 | Hough |
| 3,660,957 A | 5/1972 | Schankler |
| 3,695,434 A | 10/1972 | Whitten, Jr. |
| 3,748,810 A | 7/1973 | Mattingly |

(Continued)

FOREIGN PATENT DOCUMENTS

| CN | 1256250 | 6/2000 |
| DE | 2 141 460 | 2/1973 |

(Continued)

OTHER PUBLICATIONS

International Search Report and Written Opinion for International Application No. PCT/US2011/051129 mailed Feb. 8, 2012.

(Continued)

*Primary Examiner* — Tony G Soohoo
*Assistant Examiner* — Peter Keyworth
(74) *Attorney, Agent, or Firm* — Merchant & Gould P.C.

(57) ABSTRACT

A low cost method and system for treating water, which will be used in an industrial process, is provided. A system of the invention generally includes at least one containing means, at least one coordination means, at least one chemical application means, at least one mobile suction means, and at least one filtration means. The coordination means can control the necessary processes depending on the system needs (e.g., water quality or purity). The method and system of the invention purifies the water and eliminates suspended solids without the need of filtering the totality of the water volume, but only filtering a small fraction of up to 200 times less than the flow filtered by a conventional water treatment filtration system.

11 Claims, 1 Drawing Sheet

(56) References Cited

U.S. PATENT DOCUMENTS

| | | |
|---|---|---|
| 3,788,982 A | 7/1974 | Zsoldoes, Jr. et al. |
| 3,844,760 A | 10/1974 | Nelson |
| 3,950,809 A | 4/1976 | Schatzmann |
| 4,090,266 A | 5/1978 | Price |
| 4,100,641 A | 7/1978 | Pansini |
| 4,119,535 A | 10/1978 | White |
| 4,129,904 A | 12/1978 | Pansini |
| 4,176,058 A | 11/1979 | Grobler |
| 4,254,525 A | 3/1981 | Combest |
| 4,254,818 A | 3/1981 | Melamed |
| 4,263,759 A | 4/1981 | Miller |
| 4,304,022 A | 12/1981 | Sommer |
| 4,338,697 A | 7/1982 | Broadwater |
| 4,343,696 A | 8/1982 | Hung |
| 4,402,101 A | 9/1983 | van Zyl |
| 4,519,914 A | 5/1985 | Etani |
| 4,581,075 A | 4/1986 | St. Martin |
| 4,640,784 A | 2/1987 | Cant |
| 4,652,378 A | 3/1987 | Marikovsky et al. |
| 4,692,956 A | 9/1987 | Kassis |
| 4,752,740 A | 6/1988 | Steininger |
| 4,767,511 A * | 8/1988 | Aragon .................. 210/743 |
| 4,776,053 A | 10/1988 | Kiraly |
| 4,835,810 A | 6/1989 | Hugo |
| 4,849,024 A | 7/1989 | Supra |
| 4,880,547 A | 11/1989 | Etani |
| 4,889,622 A | 12/1989 | Newcombe-Bond |
| 4,948,296 A | 8/1990 | Salter |
| 4,952,398 A | 8/1990 | Tapin |
| 5,028,321 A | 7/1991 | Stone et al. |
| 5,039,427 A | 8/1991 | Conover |
| 5,106,229 A | 4/1992 | Blackwell |
| 5,107,872 A | 4/1992 | Meincke |
| 5,108,514 A | 4/1992 | Kisner |
| 5,143,623 A | 9/1992 | Kroll |
| 5,172,445 A | 12/1992 | Chandler |
| 5,245,723 A | 9/1993 | Sommer |
| 5,293,659 A | 3/1994 | Rief et al. |
| 5,337,434 A | 8/1994 | Erlich |
| 5,346,566 A | 9/1994 | White |
| 5,398,361 A | 3/1995 | Cason |
| 5,454,129 A | 10/1995 | Kell |
| 5,662,940 A | 9/1997 | Hight et al. |
| 5,802,631 A | 9/1998 | Friedman |
| 5,842,243 A | 12/1998 | Horvath et al. |
| 5,985,156 A | 11/1999 | Henkin et al. |
| 6,017,400 A | 1/2000 | Clark et al. |
| 6,149,819 A | 11/2000 | Martin et al. |
| 6,228,272 B1 * | 5/2001 | Gola .................. 210/742 |
| 6,280,639 B1 | 8/2001 | Ortiz |
| 6,284,144 B1 | 9/2001 | Itzhak |
| 6,303,038 B1 | 10/2001 | Sanders et al. |
| 6,317,901 B1 | 11/2001 | Corpuel |
| 6,409,926 B1 | 6/2002 | Martin |
| 6,419,840 B1 | 7/2002 | Meincke |
| 6,444,176 B1 | 9/2002 | Yoshinaga et al. |
| 6,539,573 B1 | 4/2003 | Caccavella |
| 7,252,843 B2 | 8/2007 | Moore et al. |
| 7,820,055 B2 | 10/2010 | Fischmann Torres |
| 7,862,712 B2 | 1/2011 | Tak |
| 2002/0117430 A1 * | 8/2002 | Navarro et al. .................. 210/85 |
| 2003/0091467 A1 | 5/2003 | Kmec et al. |
| 2003/0094421 A1 | 5/2003 | Gargas |
| 2003/0228195 A1 | 12/2003 | Mizutani |
| 2004/0025269 A1 | 2/2004 | Pichon |
| 2004/0129644 A1 | 7/2004 | Unhoch |
| 2004/0211450 A1 | 10/2004 | Stoltz |
| 2004/0217326 A1 | 11/2004 | Souter et al. |
| 2004/0226896 A1 | 11/2004 | Lovestead et al. |
| 2006/0054568 A1 | 3/2006 | Jones et al. |
| 2006/0169322 A1 | 8/2006 | Torkelson |
| 2006/0174430 A1 | 8/2006 | Pareti |
| 2007/0059562 A1 | 5/2007 | Hattori et al. |
| 2007/0181498 A1 * | 8/2007 | Kaas .................. 210/641 |
| 2008/0116142 A1 | 5/2008 | Fischmann Torres |
| 2009/0050572 A1 | 2/2009 | McGuire et al. |
| 2010/0320147 A1 | 12/2010 | Mcguire et al. |
| 2011/0061194 A1 | 3/2011 | Fischmann Torres |
| 2011/0062067 A1 | 3/2011 | Fischmann Torres |
| 2011/0210076 A1 | 9/2011 | Fischmann Torres |

FOREIGN PATENT DOCUMENTS

| | | |
|---|---|---|
| DE | 19515428 | 11/1996 |
| DE | 297 16 994 | 1/1998 |
| DE | 198 14 705 | 10/1998 |
| DE | 198 60 568 | 12/1998 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

International Search Report and Written Opinion for International Application No. PCT/US2011/051236 mailed Jan. 26, 2012.
International Search Report and Written Opinion for International Application No. PCT/US2011/051244 mailed Jan. 25, 2012.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.
International Search Report mailed May 6, 2009, in co-pending related PCT Application No. PCT/US2009/036809.
Singapore Office Action for corresponding application No. 200717963-3 dated Dec. 23, 2010.
Second Singapore Office Action for corresponding application No. 200717963-3 dated Dec. 23, 2010.
Pakistan Examination Report.
African Regional Intellectual Property Organization (ARIPO) report for corresponding application No. AP/P/2007/004242 dated Dec. 7, 2010.

Japanese Office Action for corresponding application No. 2007-299975 dated May 31, 2011—translation provided.
Peruvian Technical Report for corresponding application No. 000244-2007 dated Sep. 2, 2010 —translation provided.
Office Action for corresponding U.S. Appl. No. 12/884,842 mailed Mar. 1, 2011.
Office Action for corresponding U.S. Appl. No. 12/884,872 mailed Mar. 1, 2011.
European Search Report from European Application No. 07 07 5995 mailed Mar. 9, 2010.
Norwegian Search Report from Norwegian Application No. 20075880 dated Feb. 4, 2010.
Panama Search Report from Panama Application No. 87176-01 dated Mar. 17, 2010.
Panama Search Report from Panama Application No. 88509-01 dated Oct. 7, 2010.
Chilean Examiner's report from Application No. 3900-08 issued Aug. 31, 2009.
Non-Final Office Action mailed Apr. 3, 2012 from U.S. Appl. No. 13/136,458.
Final Office Action mailed Nov. 28, 2011 from U.S. Appl. No. 13/076,151.
Non-Final Office Action mailed Apr. 19, 2012 from U.S. Appl. No. 13/195,695.
Non-Final Office Action mailed Jul. 19, 2011 from U.S. Appl. No. 13/076,151.
Restriction Requirement Office Action mailed Jan. 13, 2012 from U.S. Appl. No. 13/136,458.
"Ambient Water Quality Criteria for Bacteria- 1986", Jan. 1986, United States EPA, EPA440/5-84-002, p. 16.

* cited by examiner

METHOD AND SYSTEM FOR TREATING WATER USED FOR INDUSTRIAL PURPOSES

This application claims benefit of U.S. Provisional Ser. No. 61/469,537, filed 30 Mar. 2011 and which application is incorporated herein by reference. To the extent appropriate, a claim of priority is made to the above disclosed application.

FIELD OF THE INVENTION

The present invention relates to a low cost method and system for treating water, which will be used in an industrial process. The method and system of the invention purifies the water and eliminates suspended solids without the need of filtering the totality of the water volume, but only filtering a small fraction of up to 200 times less than the flow filtered by a conventional water treatment filtration system.

BACKGROUND

High microbiological quality water with high clarity is a scarce resource that is currently required for the processes of many industries. The treatment for obtaining such water entails large investment and operating costs, and the processes are complicated and present many problems that have not been effectively solved to the present day. Also, the processes consume large amounts of energy and chemicals, thus severely damaging the environment. Specifically, removing impurities that are contained in the water, such as suspended solids, metals, algae, and bacteria, among others, requires the installation of expensive and complex filtration systems that allow filtering the entire volume of water, thus presenting high energy consumption, high chemical and material requirements, and other resources that hinder this process.

High microbiological quality water is required for several important processes, such as the pretreatment of water for reverse osmosis desalination processes, for treating water used in aquaculture, for treating and maintaining water for the potable water industry, for treating industrial liquid residuals, or for mining industries, among others. The water of high microbiological quality and clarity at very low costs of the present invention can also be used in other industrial processes that require high physicochemical and microbiological quality water.

Desalination

There are several reasons for addressing the improvement of current desalination processes, since this industry is growing exponentially and will be very important in the future. From the total water available in the world, 97% of it corresponds to seawater. From the remaining 3% of fresh water available, 2.1% is frozen in the poles and only a 0.9% is available for human consumption, which is found in rivers, lakes, or as groundwater. The limited availability of freshwater for human consumption is a problem that has been increasing along with global population growth and cultural change. About 40% of the world's population already suffers from problems caused by lack of access to sources of freshwater.

Thus, just as the United Nations Environment Programme (UNEP) has warned, it is expected that nearly 3 billion people will suffer from severe water shortages within the next 50 years. Also, in 1999, the UNEP identified the shortage of water along with global warming as the biggest problems for the new millennium. The freshwater resources are being consumed at a rate greater than nature can replenish them, and also, pollution and exploitation of groundwater and surface water have led to a decrease in the quantity and/or quality of available natural resources. The combination of increasing population, the lack of new sources of freshwater, and the increasing of per capita water consumption, causes an aggravation of regional tensions among countries that are located near water resources. All of the above obligates to find a solution to the problem of water availability, not only to meet the future demands of humanity, but also to avoid the conflicts that water shortages can lead to.

Conveniently, seawater is the most abundant resource on earth, a virtually inexhaustible source of salt water which is always available for use. Therefore, to solve the immense problems associated with the short supply of fresh water, the best solution is to process sea water to provide fresh water for general consumption. The vast availability of sea water contained in the oceans has led to research and creation of technologies to remove the salts in the water by various processes, and produce fresh water. The best available technology in the world to achieve this objective is the desalination process. Currently, about 130 countries worldwide are implementing some type of desalination process, and it is expected that the installed capacity will be doubled by 2015.

The two most used desalination processes are:
 Using water evaporation, as a distillation process, in such a way to evaporate only the water molecules, leaving behind all salts and dissolved minerals. This process is called thermal desalination.
 Using special membranes which allow performing the reverse osmosis process, separating the water from salts through application of pressure on a semi-permeable membrane. This process is called reverse osmosis.

To decide between what process to use, energy consumption is an important factor to consider. It is estimated that the consumption of energy to produce 1 $m^3$ of water using thermal desalination is between 10 to 15 $kWh/m^3$, while a process using reverse osmosis technology uses about 5 $kWh/m^3$. This is because thermal desalination requires evaporation, so more energy is needed for the phase change process, making thermal desalination less efficient in terms of energy consumption. Current restrictions require improving the overall efficiency of processes, using technologies that meet the environmental requirements demanded by society, while minimizing the carbon footprint and the environmental impact.

In terms of the evolution of the mentioned technologies, since 2005 the global installed capacity of reverse osmosis desalination plants has exceeded the installed capacity of thermal plants. The projection is that by 2015 the world's desalination capacity will be distributed by 62% in reverse osmosis plants and 38% in thermal desalination plants. In fact, the global capacity to produce fresh water in desalination plants using reverse osmosis technologies has increased by over 300% in just 6 years.

Reverse osmosis is a process by which pressure is applied to a flow of water having a high concentration of salts, through a semi-permeable membrane that only lets water molecules to pass through. Because of this, the permeate leaving the other side of the membrane corresponds to high microbiological quality water with a low salt content. Within the operation of desalination plants using reverse osmosis technology, there are 2 main stages:
 1. Water pretreatment
 2. Desalination Stage The second stage, corresponding to the reverse osmosis process itself, has been extensively studied and efficiencies of up to 98% have been achieved (General Electric HERO Systems).

The first stage of the process of producing fresh water using reverse osmosis corresponds to the conditioning of salt water before reaching the semi-permeable membrane, also called water pretreatment. This pretreatment step experiences major problems related to water quality needed for efficient operation of reverse osmosis membranes. In fact, it is estimated that 51% of reverse osmosis membranes fail due to poor pretreatment, either due to poor design or poor operation, while 30% fail because of inadequate dosing of chemicals. Current methods, in addition to being inefficient due to high rate of failures, have very high costs thereby driving research to find new methods that solve these problems.

The problems arising in the membranes depend on the characteristics of feed water, which fouls the filters and membranes located prior to pretreatment and also the reverse osmosis membranes. These problems are reflected in a shorter life and higher frequencies of maintenance and cleaning of the membranes, leading to higher costs of operation and maintenance. Common problems that arise due to poor water pretreatment are divided into 2 types: damage of the membranes and blocking of the membranes.

The damage of reverse osmosis membranes is mainly caused by oxidation and hydrolysis of membrane material because of diverse compounds in the feed water. Most reverse osmosis membranes cannot withstand existing concentrations of residual chlorine, which is usually added in desalination processes to prevent biological growth. The membranes have high costs, so all possible precautions to maintain continuous operation and achieve the best possible performance should be taken; thus, the water must be often dechlorinated before it passes through the membranes. Eventually, the pH of the feed water should also be adjusted for optimal operation of the membranes. In addition, dissolved oxygen and other oxidizing agents must be removed to prevent damage to the membranes. The gases also affect the proper operation of the membranes, so high concentrations should be avoided for optimal operation. Current methods to regulate the concentrations of gases and oxidizing agents are very expensive and inefficient.

On the other hand, blocking of reverse osmosis membranes is largely responsible for the large inefficiencies that arise because of various reasons, for example, higher pressures need to be applied on the feed water to pass through the membrane, major downtime is caused by the constant maintenance and washing that has to be performed, and the high replacement costs of supplies used in the process. The blocking of the membranes is caused by three major problems: biofouling, scaling and colloidal fouling.

Biofouling is caused by the growth of colonies of bacteria or algae on the surface of the membrane. Because chlorine cannot be used, the risk of developing a film of biomass exists, thus preventing the passage of water supply and reducing the efficiency of the system.

Another major problem that causes blockage of the membrane is scaling which finally causes their obstruction. Scaling refers to precipitation and deposits of moderately soluble salt on the membranes. In fact, under certain operating conditions, the solubility limits of some of the components present in the feed water may be exceeded, allowing precipitation. These components include calcium carbonate, magnesium carbonate, calcium sulfate, silica, barium sulfate, strontium sulfate and calcium fluoride, among others. In reverse osmosis units, the final stage is subject to the highest concentration of dissolved salts, and this is where the first signs of scaling begin to appear. Scaling due to precipitation is amplified by the phenomenon of concentration gradient on the surface of the membranes.

Obstruction by particles or colloidal fouling occurs when the water supply contains a large amount of suspended particles and colloidal matter, requiring constant washing to clean the membranes. The concentration of particles in water can be measured and expressed in different ways. The most used parameter is the turbidity, which must be maintained at low levels for proper operation. The accumulation of particles on the surface of the membrane can adversely affect both the feed water flow and the rejection properties of reverse osmosis membrane. The colloidal fouling is caused by the accumulation of colloidal particles on the surface of the membrane and the formation of a layer with a cake form. The decrease in permeate flux is given on the one hand by the formation of a cake layer, and on the other hand, because of the high concentration of salt in the membrane surface caused by the obstructed diffusion of salt ions, causing an increased osmotic pressure which reduces the net force impulse. The monitored parameter to prevent colloidal fouling is the Silt Density Index (SDI), and membrane manufacturers suggest SD's of up to 4. Blockage of the membranes can also occur due to fouling by Natural Organic Matter (NOM). The natural organic matter clogs the membrane either because: the narrowing of pores associated with the adsorption of natural organic matter on the walls of the pores, colloidal organic matter which acts as a stopper at the opening of the pores, or forming a continuous layer of gel that coats the surface of the membrane. This layer creates great inefficiencies and clogging of this layer should therefore be avoided at all costs.

Currently, the pretreatment of water before entering the desalination process generally includes the following steps:
1. Chlorination to reduce organic and bacteriological load in raw water
2. Sand filtration to reduce turbidity
3. Acidification to reduce pH and reduce calcareous processes
4. Inhibition of calcium and barium scales using antiscalants
5. Dechlorination to remove residual chlorine
6. Particle filtering cartridges required by membrane manufacturers
7. Microfiltration (MF), Ultrafiltration (UF) and Nanofiltration (NF)

Among the pretreatment steps above, the costs of filtration steps, either with sand filters or more sophisticated filtration steps such as microfiltration, ultrafiltration or nanofiltration, leads to high costs along with a number of drawbacks. In particular, if the pretreatment is inadequate, the filters become clogged with organic matter, colloids, algae, microorganisms, and/or larvae. In addition, the requirement to filter the total volume of water to be processed in the plant to reduce turbidity and remove particles imposes severe restrictions in terms of energy, implementation and installation costs, as well as during the operation in terms of maintenance and replacement of filters. In addition, pretreatment systems today are very inefficient and have high costs due to the devices to be implemented, and the continuing operating and maintenance tasks that are costly and difficult to perform.

In summary, increasingly scarce freshwater resources has created a worldwide supply problem that has resulted in the design and implementation of various desalination technologies. Reverse osmosis desalination is a promising technology for addressing the increasing scarcity of freshwater resources, and this technology is projected to have significant growth in the future. However, a cost effective and energy efficient means of pretreating the feed water poses a significant problem for reverse osmosis desalination plants. An efficient technology that operates at low costs and is able to produce water of sufficient quality for its use as raw material in desalination processes is needed.

Aquaculture Industry

The aquaculture industry is focused on farming of aquatic species, plants and animals, from which raw materials for food, chemical, and pharmaceutical industries, among others, is obtained. The aquatic species are grown in fresh or sea water, where mainly fish, mollusks, crustaceans, macro-algae and microalgae are cultivated. Due to industry growth, development of new technologies, and environmental regulations imposed by the international community, there is a need to minimize the environmental impact of the aquaculture industry while at the same time maintaining adequate control of the operation conditions. To do this, the cultivation of aquatic species have migrated from being located in situ in natural water sources, such as the sea, to facilities built specifically for such purposes.

Besides the traditional culture of these species as raw material in food, pharmaceutical industries and general manufacturing, aquatic species are also used in the energy sector to generate energy from renewable non-conventional sources, in particular, for the production of biofuels such as biodiesel from microalgae.

With regard to biofuels, it should be noted that the global energy matrix is organized around fossil fuels (oil, gas and coal), which provide about 80% of global energy consumption. Biomass, hydroelectric, and other "non-conventional" energy sources, such as solar energy, are renewable energy sources. Within the latter group, and representing only 2.1% of the matrix, are comprised eolic energy, solar energy, and biofuels, which in turn include biogas, biodiesel and ethanol, mainly.

Because the sources of fossil and nuclear energy are finite, future demand may not be supplied. Accordingly, energy policy in developing countries is considering the introduction of alternative energies. Additionally, the abuse of conventional energy like oil and coal, among others, lead to problems such as pollution, increased greenhouse gases and the depletion of the ozone layer. Therefore, the production of clean, renewable, and alternative energies is an economic and environmental need. In some countries, the use biofuels blended with petroleum fuels, has forced massive and efficient production of biodiesel, which can be obtained from vegetable oil, animal fats and algae.

The production of biodiesel from algae does not require the extensive use of agricultural land. Thus, it does not affect food production worldwide, because the algae can grow in reduced spaces and have very fast growth rates, with biomass doubling times of 24 hours. Consequently, algae are a source of continuous and inexhaustible energy production, and also absorb carbon dioxide for their growth, which can be captured from various sources such as thermal power stations.

The main systems for microalgae growth correspond to:
Lakes: Since algae require sun light, carbon dioxide, and water, they can be grown in lakes and open ponds.
Photo bioreactors: A photo bioreactor is a controlled and closed system including a source of light, which by being closed require the addition of carbon dioxide, water and light.

With respect to lakes, algae cultivation in open ponds has been extensively studied. This category of ponds are natural water bodies (lakes, lagoons, ponds, sea) and artificial ponds or containers. The most commonly used systems are large ponds, tanks, circular ponds and shallow raceway ponds. One of the main advantages of open ponds is that they are easier to construct and operate than most closed systems. However, the main constraints in natural open ponds are evaporation losses, requiring large surface of land, pollution from predators and other competitors in the pond, and the inefficiency of the agitation mechanisms resulting in low biomass productivity.

To this end, "raceway ponds" were created, which are operated continuously. In these ponds, the algae, water and nutrients are circulated in a type of racetrack, and are mixed with the aid of paddle wheels, to re-suspend the algae in the water, so that they are in constant movement and always receive sunlight. The ponds are shallow due to the need of algae for light, and that the penetration of sunlight reaches a limited depth.

Photo bioreactors allow the cultivation of a single species of microalgae for a long time and are ideal for producing a large biomass of algae. Photo bioreactors generally have a diameter less than or equal to 0.1 m, because a greater range would prevent light from entering the deeper zones, as the crop density is very high, in order to achieve a high yield. The photo bioreactors require cooling during daylight hours, and also need temperature control at night. For example, the loss of biomass produced at night can be reduced by lowering the temperature during these hours.

The biodiesel production process depends on the type of algae grown, which are selected based on performance and adaptation characteristics to environmental conditions. Microalgae biomass production is started in photo bioreactors, where $CO_2$ that generally comes from power plants is fed. Later, before entering the stationary growth phase, the microalgae are transported from photo bioreactors to tanks of greater volume, where they continue to develop and multiply, until the maximum biomass density is reached. The algae are then harvested by different separation processes, to obtain algal biomass, which is ultimately processed to extract biofuel products.

For the cultivation of microalgae, virtually sterile purified water is required, as productivity is affected by the contamination of other unwanted species of algae or microorganisms. The water is conditioned according to specific culture medium, also depending on the needs of the system.

The key factors to control the rate of algal growth are:
Light: Needed for the photosynthesis process
Temperature: ideal range of temperature for each type of algae
Medium: water composition is an important consideration, for example, salinity
pH: usually algae require a pH between 7 and 9 to obtain an optimal growth rate
Strain: each algae has a different growth rate
Gases: Algae require $CO_2$ to perform photosynthesis
Mixing: to avoid algae settling and warranty homogeneous exposition to light
Photoperiod: cycles of light and darkness Algae are very tolerant to salinity, most of the species grow better with a salinity that is slightly inferior to the salinity found in the algae's natural environment, which is obtained by dilution of seawater with fresh water.

Drinking Water Industry

The water industry provides drinking water to residential, commercial, and industrial sectors of the economy. In order to provide potable water, the industry generally begins its operations with the collection of water from high microbiological quality and clarity natural sources, which is then stored in reservoirs for future use. The water can be stored for long periods of time in the reservoir without being used. The quality of water stored for long period of time begins to deteriorate as microorganisms and algae proliferate in the water, making the water unsuitable for human consumption.

Since the water is no longer suitable for consumption, it must be processed in a potable water treatment plant, where it passes through various stages of purification. In the purification plants, chlorine and other chemicals are added in order to produce high quality water. Reaction of chlorine with the organic compounds present in the water can produce several toxic by-products or disinfection by-products (DBP). For example, in the reaction of chlorine with ammonia, chloramines are undesired by-products. Further reaction of chlorine or chloramines with organic matter will produce trihalomethanes, which have been indicated as carcinogenic compounds. Also, depending on the disinfection method, new DBPs have been identified, such as iodinated trihalomethanes, haloacetonitriles, halonitromethanes, haloacetaldehydes, and nitrosamines. Furthermore, exposure of bathers to chlorine and organic matter has been mentioned as a factor contributing to potential respiratory problems, including asthma.

Wastewater Industries

Wastewater is treated every day to produce clean water used for different purposes. There is a need to treat wastewater producing small amounts of sludge and waste, and also using less chemicals and energy.

Mining Industry

Mining is a very important industry throughout the world, and highly collaborates to each nation's economy. Mining industries require water for many of their processes, a resource that is limited and that everyday becomes scarcer. Some mining industries have developed technologies for utilizing seawater in the majority of their processes, being able to operate only with this resource.

The mines themselves are generally located at great distances and heights from the coastal line, therefore the water has to travel many kilometers to reach the mines. To transport the large quantities of water, pumping stations have been constructed, along with very long pipes, in order to pump the water from the sea to the mines.

The pumping stations consist on structures that comprise high power pumps, which send the collected seawater to the next pumping station, and so on. The pumping stations also comprise a containing structure to maintain seawater in case of any problems that could occur in the previous pumping stations. These containing structures eventually can develop diverse problems that affect the pumping process, like the biofouling of the walls and the inner surfaces of the pipes. Biofouling causes the deterioration of the materials as well as a reduction of the transversal area of the pipes, imposing higher operational and maintenance costs. Also, the water inside of the containing structures begins to deteriorate because of the microalgae growth, which negatively interferes with the station processes, and leads to diverse and important problems such as biofouling.

Industrial Liquid Residuals Treatment

Some industries have liquid residuals that may not comply with irrigation, infiltration, or discharging requirements imposed by local government. Also, some industries have settling tanks or other containment means to allow natural processes in the water to occur, such as the emission of gases or other substances that cause bad odor or color properties.

As discussed above, current methods and systems for treating water for industrial uses have high operating costs, require the use of large amounts of chemicals, are prone to fouling, produce undesirable by-products such as gases and other substances that cause bad odor or color properties, and require filtration of the entire volume of water. Improved methods and systems of treating water for industrial use that are low cost and more efficient than conventional water treatment filtration systems are desirable.

Previous Art

Patent JP2011005463A presents a control system for the injection of coagulants and flocculants in water purification plants. Said system is based in the use of a turbidity sensor that measures the quantity and quality of water before adding the coagulants and flocculants. The system uses a classifier that measures flocculant size after settling and classifies the treated water according to these measurements. According to the turbidity measurements, the control system calculates the coagulant and flocculants injection rate, which are applied by installations destined for this means. The calculations of the dosed compounds are corrected according to a function that determines a correction factor in accordance to the turbidity measured before and after the treatment. After the settling of the particles, there is a filtration stage that filters the whole treated water volume.

The disadvantages of patent JP2011005463A are that it does not control the organic content or the microorganisms present in the water, as the system does not comprise the use of disinfectant or oxidizing agents. Also, the system in JP2011005463A does not reduce the metal content in the water and relies on the constant measure of the parameters, therefore having high demands in terms of sensors and other measuring devices. Furthermore, patent JP2011005463A requires filtering the totality of the water volume that is treated, which imposes high energy demands and high installation and maintenance costs regarding the system required for such filtration.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The method and system constructed in accordance with the principles of the present invention purify water and remove suspended solids, metals, algae, bacteria, and other items from the water at very low costs, and without the need of filtering the totality of the water volume. Only a small fraction of the total volume of the water is filtered, up to 200 times less than the flow filtered by conventional water treatment filtration systems. The treated water can be used for industrial purposes such as treating water which will be used as a raw material in industrial purposes, or treating industrial liquid residuals for infiltration, irrigation, discharging, or other purposes.

Relating to reverse osmosis desalination, the present invention provides a method and system for the pretreatment and maintenance of feed water that uses fewer chemicals and consumes less energy than conventional pretreatment technologies.

Relating to the aquaculture industry, the water produced by the present invention achieves the characteristics required for algae inoculation using a filtering means that requires the filtering of only a fraction of the total volume of water. The present invention provides water of high microbiological quality that is used for the inoculation of microalgae and other microorganisms. The use of the treated water in, for example, raceway ponds, represents a high reduction in costs, since one of the main problems of this industry is preparing the water for the inoculation. Also, the present invention allows for the treatment of the water after the algae has grown and it has been harvested. Therefore, the water can be reused creating a sustainable method for the aquaculture industry.

By using the method and system of the present invention in drinking water industries, water stored in reservoirs can be maintained at very low costs without the proliferation of microorganisms and algae which can deteriorate the water quality. Thus, drinking water treated according to the method and system of the present invention does not need to be processed in a potable water treatment plant. The present invention therefore minimizes the generation of toxic by-products and disinfection by-products (DBPs) produced by the potable water treatment plant and reduces capital costs, amounts of chemicals used, operating costs and the environmental impact and footprint of a potable water treatment plant. The present invention maintains water from very pure natural sources in a high microbiological quality state at low costs in an environmentally friendly manner without deterioration or generation of toxic DBPs.

The present invention can be used for treating water that comes from wastewater treatment facilities at very low cost, removing odor and obtaining high clarity water with low turbidity levels. The amounts of waste and sludge are considerably reduced compared to conventional wastewater treatments, thereby providing a sustainable method which is environmentally friendly.

Regarding mining industries, the present invention relates to a method and system for treating water that prevents biofouling in pumping stations, thus reducing operating and maintaining costs. The present invention can also be used for treating industrial liquid residuals coming from diverse industries, in order to comply with the irrigation, infiltration, or discharging requirements imposed by the local governments.

The method and system of the invention provides a low cost process for treating water for use in industrial processes that, unlike conventional water treatment filtration systems, purifies the water and eliminates suspended solids in the water by filtering a small fraction of the total volume of water. In an embodiment, the method of the invention comprises:

a. Collecting water with a concentration of total dissolved solids (TDS) of up to 60,000 ppm;
b. Storing said water in at least one containing means, where said containing means has a bottom able to be thoroughly cleaned by a mobile suction means;
c. Within periods of 7 days:
  i. For water temperatures up to 35 degrees Celsius, maintaining said water's ORP of at least 500 mV for a minimum period of 1 hour for each degree Celsius of water temperature, by adding disinfectant agents to the water;
  ii. For water temperatures greater than 35 degrees Celsius and up to 69 degrees Celsius, maintaining said water's ORP of at least 500 mV for a minimum period of hours by adding disinfectant agents to the water, wherein the minimum period of hours is calculated by the following equation:

[35 hours]−[Temperature of the water in degrees Celsius−35]=minimum period of hours; and iii. For water temperatures of 70 degrees Celsius or more, maintaining said water's ORP of at least 500 mV for a minimum period of 1 hour.
d. Activating the following processes through a coordination means, where the processes purify the water and eliminate the suspended solids by only filtering a small fraction of the total volume of water:
  i. Applying oxidant agents to avoid the iron and manganese concentrations to exceed 1 ppm;
  ii. Applying coagulants, flocculants, or a mixture of them to avoid the turbidity to exceed 5 NTU;
  iii. Suctioning the water flow that contains the settled particles, produced by the previous processes, with a mobile suction means to avoid the thickness of the settled material to exceed 100 mm in average;
  iv. Filtering the flow suctioned by the mobile suction means, with at least one filtration means; and
  v. Returning the filtered water to said at least one containing means;
e. Utilizing said treated water in a downstream process.

In an embodiment, the system of the invention comprises:
at least one feeding line of water (7) to at least one containing means (8);
at least one containing means (8), which comprises a receiving means for settled particles (17), that is fixed to the bottom of said containing means;
at least one coordination means (1), where the coordination means timely activates the necessary processes to adjust parameters of the water within limits specified by an operator or the coordination means;
at least one chemical application means (4), which is activated by said at least one coordination means
at least one mobile suction means (5), which moves through the bottom of said at least one containing means suctioning the water flow containing the settled particles;
at least one propelling means (6) that provides movement to said at least one mobile suction means so it can move through the bottom of said at least one containing means;
at least one filtration means (3) that filters the water flow containing the settled particles;
at least one collecting line (15) coupled between said at least one mobile suction means and said at least one filtration means;
at least one return line (16) from said at least one filtration means to said at least one containing means; and
at least one water feeding line (18) from said at least one containing means to at least one downstream process.

In the system, the receiving means is generally covered with a material comprising membranes, geo-membranes, geotextile membranes, plastic liners, concrete, or coated concrete, or a combination thereof. The coordination means is capable of receiving information, processing that information, and activating other processes, such as the chemical application means, mobile suction means, and the filtration means. The chemical application means generally includes injectors, sprinklers, manual application, dispensers by weight, pipes, or a combination thereof. The propelling means drives the mobile suction means and typically includes a rail system, a cable system, a self-propelled system, a manually propelled system, a robotic system, a system guided from a distance, a boat with an engine, a floating device with an engine, or a combination thereof. The filtration means includes a cartridge filter, sand filter, micro-filter, ultra-filter, nano-filter, or a combination thereof and is generally connected to the mobile suction means by a collecting line comprising a flexible hose, rigid hose, pipe, or a combination thereof.

The present invention addresses diverse environmental problems arising from water treatment processes. The inventor of the novel technology disclosed herein, Mr. Fernando Fischmann, has developed many new advances in water treatment technology that are rapidly being adopted throughout the world. In a short period of time, the inventor's technologies related to recreational crystalline lagoons have been incorporated into more than 180 projects throughout the world. The inventor and his advancements in water treatment technology have been the subject of more than 2,000 articles, as can be seen at http://press.crystal-lagoons.com/. The inventor has also received important international awards for innovation and entrepreneurship related to these advances in water treatment technology and has been the subject of interviews by major media outlets including CNN, BBC, FUJI, and Bloomberg's Businessweek.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

DETAILED DESCRIPTION OF THE INVENTION

Figure 1:
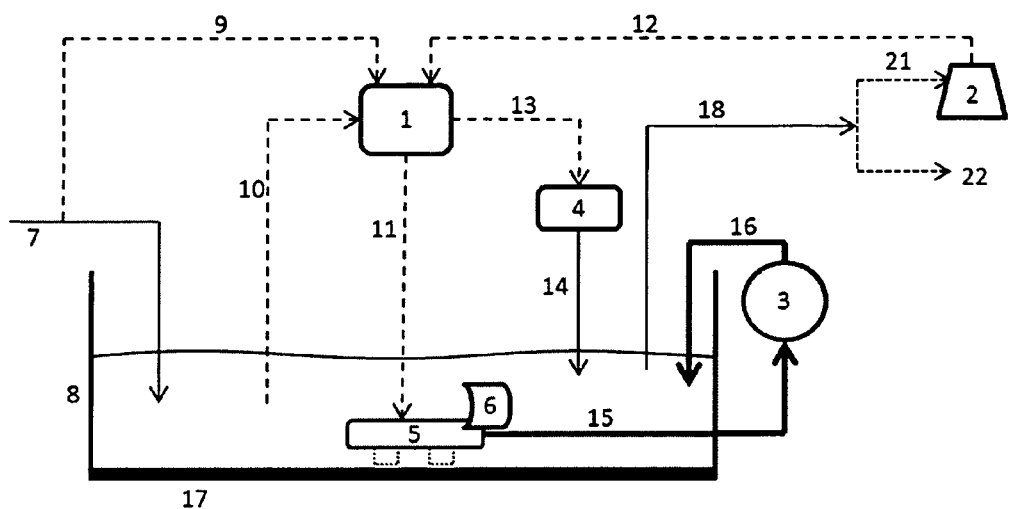
FIG. 1 is a process flow diagram illustrating water treatment in an embodiment of the invention.

The following detailed description refers to the accompanying drawings. While embodiments of the invention may be described, modifications, adaptions, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention. While systems and methods are described in terms of "comprising" various apparatus or steps, the systems and methods can also "consist essentially of" or "consist of" the various apparatus or steps, unless stated otherwise.

DEFINITIONS

In the light of the present disclosure, the following terms or phrases should be understood with the meanings described below.

The terms "container" or "containing means" are used generically herein to describe any artificial large body of water, including artificial lagoons, artificial lakes, artificial ponds, pools, and the like.

The term "coordination means" is used generically herein to describe an automated system that is able receive information, process it, and make a decision according to it. In a preferred embodiment of the invention, this could be done by a person, but more preferably with a computer connected to sensors.

The term "chemical application means" is used generically herein to describe a system that applies chemicals into the water.

The term "mobile suction means" is used generically herein to describe a suctioning device that is able to travel across the bottom surface of the containing means and suction the settled material.

The term "propelling means" is used generically herein to describe a propelling device that provides movement, either by pushing or pulling another device.

The term "filtration means" is used generically herein to describe a filtration system, encompassing terminology such as filter, strainer, separator, and the like.

As used herein, the general types of water and their respective Total Dissolved Solids (TDS) concentration (in mg/L) are fresh water, with TDS$\leq$1,500; brackish water, with 1,500$\leq$TDS$\leq$10,000; and seawater, with TDS>10,000.

As used herein, the term "high microbiological water quality" comprises a preferred aerobic bacteria count of less than 200 CFU/ml, more preferably of less than 100 CFU/ml, and most preferably of less than 50 CFU/ml.

As used herein, the term "high clarity" comprises a preferred turbidity level of less than 10 Nephelometer Turbidity Units (NTU), more preferably of less than 7 NTU, and most preferably of less than 5 NTU.

As used herein, the term "low fouling levels" comprises a preferred SDI index of less than 6, more preferably of less than 5, and most preferably of less than 4.

As used herein, the term "small fraction" corresponding to the filtrated water volume comprises a flow of up to 200 times less than the flow filtrated in traditionally configured water treatment filtration systems.

As used herein, the term "traditional water treatment filtration systems" or "conventional water treatment filtration system" comprises a filtration system that filters the entire water volume that has to be treated, from 1 to 6 times per day.

MODES FOR CARRYING OUT THE INVENTION

The present invention relates to a method and system for treating water at low cost. The method and system of the invention purifies the water and eliminates suspended solids from the water without the need of filtering the totality of the water volume. The present invention filters only a small fraction of the entire volume of water, corresponding to a flow up to 200 times smaller than for traditional water treatment methods. Treated water produced by the method and system of the invention can be used for industrial purposes, such as a raw material in industrial purposes. The method and system of the invention can also be used to treat industrial liquid residuals in order to make the liquid residuals suitable for infiltration, irrigation, discharging, or other purposes.

Water treated by a method or system of the invention can be freshwater, brackish water, or seawater. The method and system includes a coordination means that allows the timely activation of the processes required to adjust the controlled parameters within limits specified by the operator. The present invention uses far less chemicals than traditional water treatment systems, since it applies the chemicals according to the systems' necessities by using an algorithm that depends on the water temperature, thus avoiding having to maintain permanent concentrations of chemicals in the water, which result in higher operational costs.

A system of the invention generally includes at least one containing means, at least one coordination means, at least one chemical application means, at least one mobile suction means, and at least one filtration means. FIG. 1 illustrates an embodiment of a system of the invention. The system includes a containing means (8). The size of the containing means is not particularly limited, however, in many embodiments the containing means can have a volume of at least 15,000 m$^3$, or alternatively, at least 50,000 m$^3$. It is contemplated that the container or containing means can have a volume of 1 million m$^3$, 50 million m$^3$, 500 million m$^3$, or more.

The containing means (8) has a bottom able to receive bacteria, algae, suspended solids, metals, and other particles that settle from the water. In an embodiment, the containing means (8) includes a receiving means (17) for receiving the settled particles or materials from the water being treated. A receiving means (17) is affixed to the bottom of the containing means (8) and preferably is constructed of a non-porous material capable of being cleaned. The bottom of the containing means (8) is generally covered with the non-porous material allowing the mobile suction means (5) to travel across the entire inferior surface of the containing means (8) and suction the settled particles produced by any of the processes disclosed herein. The non-porous materials can be membranes, geo-membranes, geotextile membranes, plastic liners, concrete, coated concrete, or combinations thereof. In a preferred embodiment of the invention, the bottom of the containing means (8) is covered with plastic liners.

The containing means (8) can include an inlet line (7) for feeding water to the containing means (8). The inlet line (7) allows for the refilling of the containing means (8) due to evaporation, consumption of water due to usage in an industrial process, and other losses of water.

The system includes at least one coordination means (1) which can control the necessary processes depending on the system needs (e.g., water quality or purity). Such processes can include activation (13) of a chemical application means (4) and the activation (11) of a mobile suction means (5). The coordination means (1) can vary the flow of treated water to the industrial process (2) based on information (12) such as output or production rate. The controlling means also may receive information (9) about the inlet line (7), as well as receiving information (10) about the water quality and settled material thickness at the bottom of the containing means (8).

The coordination means (1) allows for the addition of chemicals to the containing means (8) only when they are actually needed, avoiding the need to maintain a permanent concentration in the water by applying an algorithm that depends on water temperature. Thus, there can be a considerable reduction in the amount of chemicals used, of up to 100 times as compared to conventional water treatment protocols, which decreases operating costs. The coordinating means (1) can receive information (10) regarding the water quality parameters that are controlled, and can timely activate the processes necessary to adjust said quality parameters within their respective limits. The information (10) received by coordinating means (1) can be obtained by visual inspection, empirical methods, algorithms based on experience, by electronic detectors, or combinations thereof. Coordinating means (1) can comprise one or more people, electronic devices, any means capable of receiving information, processing that information, and activating other processes, and this includes combinations thereof. One example of a controller means is a computing device, such as a personal computer. Coordinating means (1) can also include sensors utilized to receive information (10) regarding the water quality parameters.

The chemical application means (4) is activated by the coordination means (1) and applies or dispenses chemicals (14) into the water. Chemical application means (4) include, but are not limited to, injectors, sprinklers, manual application, dispensers by weight, pipes, and combinations thereof.

The mobile suction means (5) moves along the bottom of the containing means (8), suctioning water containing settled particles and materials produced by any of the processes disclosed herein. A propelling means (6) is coupled to the mobile suction means (5) allowing the mobile suction means (5) to travel across the bottom of the containing means (8). The propelling means (6) drives the mobile suction means (5) by using a system selected from a rail system, a cable system, a self-propelled system, a manually propelled system, a robotic system, a system guided from a distance, a boat with an engine or a floating device with an engine, or combinations thereof. In a preferred embodiment of the invention, the propelling means is a boat with an engine.

The water suctioned by the mobile suction means (5) can be sent to a filtration means (3). The filtration means (3) receives the flow of water suctioned by the mobile suction means (5) and filters the suctioned water containing the settled particles and materials, thus eliminating the need to filter the totality of the water volume (e.g., only filtering a small fraction). The filtration means (3) includes, but is not limited, cartridge filters, sand filters, micro-filters, nano-filters, ultra-filters, and combinations thereof. The suctioned water can be sent to the filtration means (3) by a collecting line (15) connected to the mobile suction means (5). The collecting line (15) can be selected from flexible hoses, rigid hoses, pipes of any material, and combinations thereof. The system can include a return line (16) from the filtration means (3) back to the containing means (8) to return the filtered water.

The system can also include a water outlet line (18) that provides treated water from the containing means (8) to the industrial process (2). Examples of the industrial process include, but are not limited to, reverse osmosis, desalination, evaporation, purification, algae cultivation, an aquaculture process, a mining process, and combinations thereof. The industrial process can use the treated water as raw material (21) for its processes, or it can apply the method in order to treat residual water (22) for different purposes, such as maintenance purposes, irrigation, infiltration, or discharge purposes, among others. The predetermined parameter limits depend on the requirements of the industrial process (2). The industrial process (2) can in turn modify the limits (12) in order to adjust to its processes.

Figure 2:
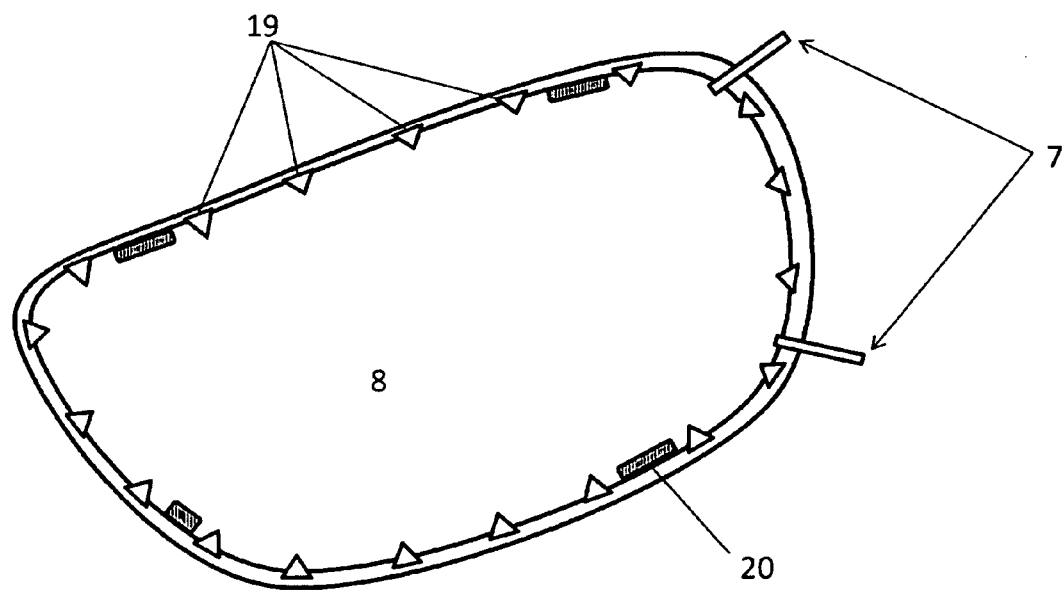
FIG. 2 shows a top view of the water containing structure, such as a lagoon, in an embodiment of the invention.

FIG. 2 shows a top view of a system of the invention. Containing means (8) can include a feeding pipe system (7) that allows for refilling of the containing means (8) due to evaporation, consumption of water in an industrial process, or other loss of water from the containing means (8). The containing means (8) can also include injectors (19) arranged along the perimeter of the containing means (8) for applying or dispensing chemicals into the water. The containing means (8) can also include skimmers (20) for removing surface oils and particles.

In an embodiment, a system of the invention includes the following elements:
  at least one feeding line of water (7) to at least one containing means (8);
  at least one containing means (8), which comprises a receiving means for the settled particles (17) produced by any of the processes disclosed herein, that is fixed to the bottom of said containing means;
  at least one coordination means (1), where the coordination means timely activates the necessary processes to adjust the parameters within their limits;
  at least one chemical application means (4), which is activated by said at least one coordination means
  at least one mobile suction means (5), which moves through the bottom of said at least one containing means suctioning the water flow containing the settled particles produced by the any of the processes disclosed herein;
  at least one propelling means (6) that provides movement to said at least one mobile suction means so it can move through the bottom of said at least one containing means;

at least one filtration means (3) that filtrates the water flow containing the settled particles, thus not needing to filter the totality of the water volume, but only filtering a small fraction;

at least one collecting line (15) coupled between said at least one mobile suction means and said at least one filtration means;

at least one return line (16) from said at least one filtration means to said at least one containing means; and at least one water outlet line (18) from said at least one containing means to a downstream process.

This same system allows for the elimination of other compounds that are susceptible to settling by the addition of a chemical agent, since the mobile suction means (5) will suction all the settled particles from the bottom of the containing means (8).

The method of the invention for treating water can be performed at low costs compared to traditional water treatment systems, as the present invention uses less chemicals and consumes less energy than traditional water treatment systems. In one aspect, the present method uses significantly less chemicals compared to traditional water treatment systems because it applies an algorithm that allows maintaining an ORP of at least 500 mV for a certain period of time depending on the temperature of the water, which maintains water having high microbiological quality according to the needs of the process in which the water will be used. The present method is carried out on a system as described herein that includes a coordination means (1). The coordination means determines when to apply the chemicals to the water in order to adjust the controlled parameters within their limits, based on the information received from the system. Since a coordination means is used, the chemicals are applied only when they are needed, avoiding the need to maintain a permanent concentration of the chemicals in the water. Thus, there is a considerable reduction on the amount of chemicals, of up to 100 times less than traditional water treatment systems, which decreases operating and maintaining costs.

In another aspect, the method and system of the invention filters only a small fraction of the total volume of water within a particular time frame compared to conventional water treat filtration systems that filter a much larger volume of water in the same time frame. In an embodiment, the small fraction of the total volume of water is up to 200 times smaller than the flow processed in traditionally configured centralized filtration systems, which filter the totality of the water volume within the same time frame. The filtering means in the method and system of the invention operates at shorter periods of time due to the orders received from the coordination means, thus the filtering means has a very small capacity, and up to 50 times lower capital costs and energy consumption compared to the centralized filtering unit required in the processing of water with traditional methods.

The method and system of the invention allow for the treatment of water at low costs. The method and system remove metals, bacteria, algae, and the like from the water and provide treated water having low fouling levels, measured as the Silt Density Index (SDI). Thus, the method and system provide high microbiological quality and clarity water that can be used for industrial purposes. In an embodiment, the method and system of the invention can treat water which will be used as raw material in industrial purposes. The method and system can also be used to treat industrial liquid residuals for infiltration, irrigation, discharging, or other purposes using less chemicals than conventional water treatment systems and without filtering the entire volume of water as in conventional water treatment systems.

In an embodiment, the method of the invention includes the following stages:

a. Collecting water (7) with a concentration of total dissolved solids (TDS) of up to 60,000 ppm;

b. Storing said water in at least one containing means (8), where said containing means has a bottom (17) able to be thoroughly cleaned by a mobile suction means;

c. Within periods of 7 days:
  i. For water temperatures up to 35 degrees Celsius, maintaining said water's ORP of at least 500 mV for a minimum period of 1 hour for each degree Celsius of water temperature, by adding disinfectant agents to the water;
  ii. For water temperatures greater than 35 degrees Celsius and up to 69 degrees Celsius, maintaining said water's ORP of at least 500 mV for a minimum period of hours by adding disinfectant agents to the water, wherein the minimum period of hours is calculated by the following equation:

$$[35 \text{ hours}] - [\text{Temperature of the water in degrees Celsius} - 35] = \text{minimum period of hours; and}$$

iii. For water temperatures of 70 degrees Celsius or more, maintaining said water's ORP of at least 500 mV for a minimum period of 1 hour.

d. Activating the following processes through a coordination means (1), where the processes eliminate the suspended solids by filtering only a small fraction of the total water volume, thus replacing the conventional water treatments that filter the totality of the water volume:
  i. Applying oxidant agents to avoid the iron and manganese concentrations to exceed 1 ppm;
  ii. Applying coagulants, flocculants, or a mixture of them to avoid the turbidity to exceed 5 NTU;
  iii. Suctioning the water flow that contains the settled particles, produced by the previous processes, with a mobile suction means (5) to avoid the thickness of the settled material to exceed 100 mm in average;
  iv. Filtering the flow suctioned by the mobile suction means (5), with at least one filtration means (3); and
  v. Returning the filtered water to said at least one containing means (8);

e. Utilizing said treated water in a downstream process.

Water treated by the method of the invention can be provided by a natural water source, such as oceans, groundwater, lakes, rivers, treated water, or combinations thereof. The water can also be provided by an industrial process in which liquid residuals from the industrial process are treated according to the method of the invention so that the treated liquid residuals can be used for infiltration, discharging, irrigation, or other purposes.

Disinfectant agents can be applied to the water by a chemical application means (4), in order to maintain an ORP level of at least 500 mV for a minimum period of time according to the temperature of the water, within periods of 7 days at a time. The disinfectant agents include, but are not limited to, ozone, biguanide products, algaecide and antibacterial agents such as copper products; iron salts; alcohols; chlorine and chlorine compounds; peroxides; phenolic compounds; iodophors; quaternary amines (polyquats) in general, such as benzalkonium chloride and S-Triazine; peracetic acid; halogen-based compounds; bromine based compounds, and combinations thereof.

If the water temperature is up to 35 degrees Celsius, an ORP level of at least 500 mV is maintained for a minimum period of 1 hour for each degree Celsius of water temperature.

For example, if the water temperature is 25 degrees Celsius, an ORP level of at least 500 mV is maintained for a minimum period of 25 hours, which can be distributed along the 7 day period.

If the water temperature is greater than 35 degrees Celsius and up to 69 degrees Celsius, an ORP level of at least 500 mV is maintained for a minimum period of hours which is calculated by the following equation:

[35 hours]−[Temperature of the water in degrees Celsius−35]=minimum period of hours For example, if the water's temperature is 50 degrees Celsius, an ORP level of at least 500 mV is maintained for a minimum period of 20 hours ([35]−[50−35]), which can be distributed along the 7 day period.

Finally, if the water temperature is 70 degrees Celsius or more, an ORP level of at least 500 mV is maintained for a minimum period of 1 hour.

Oxidant agents can be applied or dispersed into the water to maintain and/or prevent the iron and manganese concentrations from exceeding 1 ppm. Suitable oxidant agents include, but are not limited to, permanganate salts; peroxides; ozone; sodium persulfate; potassium persulfate; oxidants produced by electrolytic methods, halogen based compounds, and combinations thereof. Generally, the oxidant agents are applied or dispersed in to the water by a chemical application means (4).

A flocculant or coagulant agent can be applied or dispersed into the water to aggregate, agglomerate, coalesce, and/or coagulate suspected particles in the water, which then settle to the bottom of the containing means (8). Generally, flocculant or coagulant agents are applied or dispersed in to the water by a chemical application means (4). Suitable flocculant or coagulant agents include, but are not limited to polymers such as cationic polymers and anionic polymers; aluminum salts, such as aluminum chlorhydrate, alum, and aluminum sulfate; quats and polyquats; calcium oxide; calcium hydroxide; ferrous sulphate; ferric chloride; polyacrylamide; sodium aluminate; sodium silicate; natural products, such as chitosan, gelatin, guar gum, alginates, moringa seeds; starch derivatives; and combinations thereof. The fraction of water in which the floccules collect or settle is generally the layer of water along the bottom of the container. The floccules form a sediment at the bottom of the containing means (8) that can then be removed by the mobile suction means (5) without requiring that all of the water in the containing means (8) be filtered, e.g., only a small fraction is filtered.

The chemical application means (4) and mobile suction means (5) in the method and system of the invention are timely activated by a coordination means (1), in order to adjust the controlled parameters within their limits. The chemical application means (4) and mobiles suction means (5) are activated according to the system's needs, which allows for the application of significantly less chemicals compared to conventional water treatment systems, and for the filtering of a small fraction of the total volume of water, up to 200 times smaller, compared to conventional water treatment filtration systems that filter the totality of the water volume within the same time frame.

In the method and system disclosed herein, the coordination means (1) can receive information (10) regarding the water quality parameters within their respective limits. The information received by the coordination means can be obtained by empirical methods. The coordination means (1) is also capable of receiving information, processing that information, and activating the required processes according to that information, including combinations thereof. One example of a coordination means is computing device, such as a personal computer, connected to sensors which allow for measuring of the parameters and activation of the processes according to such information.

The coordination means (1) provides information (13) to the chemical application means (4) about the dosage and addition of the suitable chemicals and instructions for activating the chemical application means (4) to maintain the controlled parameters within their limits. The coordination means (1) also provides information (11) to activate the mobile suction means (5). The coordination means can simultaneously activate the filtration means (3) in order to filter the flow suctioned by the mobile suction means (5), filtering only a small fraction of the entire volume of water. The mobile suction means (5) is activated (11) by the coordination means (1) to avoid the thickness of the settled material to exceed 100 mm. When the method or system is used for producing water for desalinization purposes, the mobile suction means (5) is activated by the coordination means (1) to avoid the thickness of the settled material to exceed 10 mm. The filtration means (3) and mobile suction means (5) operate only as need to maintain the parameters of the water with their limits, for instance, only a few hours a day, as opposed to conventional filtration systems which operate substantially continuously.

The coordination means can also receive information about the collected water (9). When the concentration of TDS is less than or equal to 10,000 ppm, the Langelier Saturation Index of the water should be less than 3. For the present invention, the Langelier Saturation Index can be kept under 2 by pH adjustment, the addition of antiscalants, or a water softening process. When the concentration of TDS is higher than 10,000 ppm, the Stiff & Davis Saturation Index of the water should be less than 3. For the present invention, the Stiff & Davis Saturation Index can also be kept under 2 by pH adjustment, the addition of antiscalants, or a water softening process. Antiscalants that can be used to maintain the Langelier Saturation Index or the Stiff & Davis Saturation Index include, but are not limited to, phosphonate based compounds, such as phosphonic acid, PBTC (phosphobutan-tricarboxylic acid), chromates, zinc polyphosphates, nitrites, silicates, organic substances, caustic soda, malic acid-based polymers, sodium polyacrylate, ethylene diamine tetracetic acid sodium salts, corrosion inhibitors such as benzotriazole, and combinations thereof.

The method of the invention can optionally include a dechlorination step. Such a dechlorination step is desirable if an amount of residual chlorine which could interfere with the industrial process is detected in the water. The dechlorination can be carried out by adding chemicals including, but not limited to, reducing agents such as sodium bisulfite or sodium metabisulfite, using an active carbon filter, or a combination thereof

EXAMPLES

For the following examples, the terms "a/an/the" include plural alternatives (at least one). The disclosed information is illustrative, and other embodiments exist and are within the scope of the present invention.

Example 1

The method and system of the present invention can be used as a pretreatment stage for reverse osmosis seawater desalination processes.

Seawater from the ocean, which had a total dissolved solid's concentration of approximately 35,000 ppm, was collected in a containing means according to the invention. The container had a volume of approximately 45 million m³, with an area of 22,000 m².

The water temperature in the containing means was measured in April and had a temperature of about 18° C. As described herein, if the water temperature is 35° C. or less, then an ORP level of at least 500 mV is maintained for a minimum period of 1 hour for each ° C. of water temperature. Utilizing this algorithm, an ORP of at least 500 mV was maintained for (18×1) 18 hours during the week. The distribution was 9 hours on Monday and 9 hours on Thursday, which added up to the total 18 hours. To maintain the ORP for a period of 9 hours, sodium hypochlorite was added to the water in order to reach a concentration of 0.16 ppm in the water.

It was not necessary to perform an additional oxidation process to adjust the iron and manganese levels since the sodium hypochlorite had sufficient redox potential to oxidize the iron and magnesium. Crystal Clear®, a flocculant, was injected as a flocculant before the turbidity reached a value of 5 NTU, in concentrations of 0.08 ppm every 24 hours.

After allowing the bacteria, metals, algae and other solids to settle, a mobile suction means was activated before the thickness of the settled material layer reached 10 mm. The settled material, which was the product of the method's processes, was suctioned by a mobile suction means that moved along the bottom of the container. The suctioned water containing the settled particles was then pumped to a filter through a flexible hose, where it was filtered at a rate of 21 L/sec.

After treatment, the water had a pH of 7.96, a turbidity of 0.2 NTU, a Silt Density Index of 4, an iron concentration of less than 0.04 ppm and a manganese concentration of less than 0.01 ppm.

Pretreatment of water for reverse osmosis seawater desalination processes is important as the reverse osmosis desalination processes require high quality water to avoid clogging and fouling of the membranes. Column 2 in Table 1 below shows the water quality parameters required by membrane manufacturers. Column 3 in Table 1 shows the values for treated water obtained by the method of the present invention and demonstrates that the value for each parameter is within the range required by membrane manufacturers.

TABLE 1

| Parameters | Value required by membrane manufacturers | Value obtained using the present invention |
|---|---|---|
| SDI | <4 | 3.8 |
| Turbidity (NTU) | <1 | 0.2 |
| TDS (mg/L) | Variable | 35,000 |
| pH | ~8 | 7.96 |
| Iron (mg/L) | <0.05 | 0.04 |
| Manganese (mg/L) | <0.05 | <0.01 |

The amount of chemicals applied in the method and system of the invention to provide the treated water was significantly less than for conventional pretreatment technologies. The energy requirements were also lower compared to conventional pretreatment technologies as the present invention only filters a small amount of the total volume of water within a given time frame and does not require microfiltration, ultrafiltration or nanofiltration, which have very high energy consumptions.

Example 2

The method and system of the present invention can be used for treating water for use in the aquaculture industry, including use as conditioning water for the inoculation of microalgae.

A tank of 1 hectare of surface and a depth of 1.5 meters is used as the containing means for the water. The water is first treated in the tank and then sent to the raceways ponds where the microalgae is being cultured.

Example 3

The method and system of the present invention can be used for treating and maintaining water for the drinking water industry.

Water from meltwater or other natural water sources having the required properties of drinking water was collected. The collected water was maintained inside a containing means having a bottom capable of being thoroughly cleaned according to the method of the invention. Because the water complied with the drinking water requirements, there was no need to apply a post treatment in a drinking water plant, therefore reducing the amount of by-product produced by such a plant.

The temperature of the water in the containing means was 12° C. An ORP of at least 500 mV was maintained for (12×1) 12 hours within a period of 7 days. An ORP of 600 mV was maintained for 6 hours on Tuesday, and for 6 hours on Friday, thus completing the necessary 12 hours. To maintain such ORP, sodium bromide was added to the water in order to reach a concentration of 0.134 ppm in the water. An additional oxidation step was not needed, as the sodium bromide had sufficient redox potential to oxidize the iron and magnesium. Before the turbidity reached a value of 5 NTU, Crystal Clear®, a flocculant, was injected into the water in order to obtain a concentration of 0.08 ppm in the water. Addition of the flocculant was repeated every 48 hours.

The method and system of the invention minimized by-products and provided water having the following secondary disinfection products:

TABLE 2

| Product | Unit | Value obtained using the present invention | Official 2005 NCh 409 |
|---|---|---|---|
| Monochloramines | mg/l | <0.1 | 3 |
| Dibromochloromethane | mg/l | <0.005 | 0.1 |
| Dichlorobromomethane | mg/l | Not Detected | 0.06 |
| Tribromomethane | mg/l | 0.037 | 0.1 |
| Trichloromethane | mg/l | Not Detected | 0.2 |
| Trihalomethanes | mg/l | <1 | 1 |

The data is Table 2 shows that water maintained by the method and system of the invention had drinking water properties, and did not have to be subjected to treatment in a drinking water plant.

Example 4

The method and system of the present invention can be used for wastewater industries.

Wastewater was maintained in a tank having a bottom covered with a plastic liner, in order to avoid leakage and to allow thorough suctioniong of the settled material by the mobile suctioning device that moved across the bottom of the tank.

As a disinfectant agent, sodium hypochlorite was added to the water in order to reach a concentration of 0.16 ppm. An additional oxidation step was not necessary as the sodium hypochlorite had sufficient redox potential to oxidize the iron and magnesium. Crystal Clear®, a flocculant, was injected into the water as the water had a high turbidity level of 25 NTU before the first treatment. The flocculant was injected into the water until a concentration of 0.09 ppm was achieved in the tank. The flocculant addition was repeated every 24 hours.

A suctioning cart was activated by the coordination means in order to suction the settled material in the bottom of the tank. The suctioning cart functioned for 12 hours on the first day. After the first day, the suctioning cart only functioned 8 hours a day.

The quality of the water before and after treatment according to the method and system of the invention is shown below in Table 3.

TABLE 3

| Parameter | Unit | Value before treatment | Value after treatment |
|---|---|---|---|
| Turbidity | NTU | 25 | 0.8 |
| Smell | — | Noticeable, unpleasant | Odorless |
| Color | — | Light Brown | Colorless - High Clarity |
| Foam, grease, and suspended particles | — | Some suspended foam | No suspended foam or oils |

Example 5

The method and system of the present invention can be used for treating and maintaining water in pumping stations used for many purposes, such as mining purposes. A buffer tank in a pumping station contains seawater in case the pipes or the pumping systems are damaged or experience other problems. The water stored inside the tank begins to deteriorate after a length of time and microalgae and other microorganism being to growth begin to grown in the tank creating biofouling that adheres to the walls of the tank and pipes, reducing the transversal area and generating diverse problems that affect the water flow in the tank and pipes. The method from the present invention is applied to the buffer tank, treating the water stored in the buffer tank and maintaining the water by minimizing biofouling at low costs.

Example 6

The method and system of the present invention can be used for treating industrial liquid residuals that are produced as by-products of diverse processes. As a product of a mining process, an industrial liquid residual is generated. The liquid residual is treated in a plant that comprises a sedimentation process, sand filters, carbon filters, ultrafiltration and reverse osmosis. Two products, a permeate and rejected products, are created by this treatment. The permeate is then used for irrigation purposes, and the rejected products/water is sent to a Dissolved Air Flotation (DAF) Plant that reduces the sulfur content of the water from 500 ppm to 1 ppm. After DAF treatment, the water is sent to evaporation ponds.

A problem arose in an DAF plant where water with high sulfur content was reaching the evaporation ponds causing the ponds to have an unpleasant smell due to hydrogen sulfide in the water. Hydrogen sulfide in concentrations of less than 1 ppm is perceptible as a rotten egg smell, unpleasant to local neighbors of the evaporation pond. The method and system of the present invention was applied to the evaporation ponds in order to reduce the unpleasant smell produced by the hydrogen sulfide, by applying sodium bromide as an oxidant in order to reach concentration of 0.134 ppm in the water and maintaining an ORP level of 600 mV for a period of 20 hours within the week.

While certain embodiments of the invention have been described, other embodiments may exist. Further, any disclosed method steps or stages may be modified in any manner, including by reordering steps and/or inserting or deleting steps, without departing from the invention. While the specification includes a detailed description and associated drawings, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

The invention claimed is:

1. A method of providing water for an industrial process wherein the water is purified and suspended solids in the water are eliminated by filtering a small fraction of the total volume of water, the method comprising:
   a. Collecting water with a concentration of total dissolved solids (TDS) of up to 60,000 ppm, wherein:
      i. if the collected water has a total dissolved solids concentration less than or equal to 10,000 ppm, the Langelier Saturation Index must be less than 3, or
      ii. if the collected water has a total dissolved solids concentration greater than 10,000 ppm, the Stiff & Davis Saturation Index must be less than 3;
   b. Storing said water in at least one container, wherein said container has a bottom able to be thoroughly cleaned by a mobile suction means;
   c. During a 7 day interval, treating said water in said container during the interval by periodically adding disinfectant agents to said water to establish an oxidation reduction potential (ORP) of at least about 500 mV for a total ORP treatment time during the interval that is dependent on temperature of said water being treated, wherein:
      i. For water having a temperature up to 35 degrees Celsius (° C.), said total ORP treatment time comprises a minimum period of about 1 hour for each ° C. of water temperature;
      ii. For water having a temperature greater than 35° C. and less than 70° C., said total ORP treatment time comprises a minimum period of hours calculated by the following equation:

[35 hours]−[(Temperature of the water in degrees Celsius−35)×1 hour/° C.]=minimum period of hours;
      or iii. For water having a temperature of 70° C. or more, said total ORP treatment time comprises a minimum period of about 1 hour;
d. Activating the following processes through a coordination means to purify said water and eliminate the suspended solids by only filtering a small fraction of the total volume of said water in said container, wherein said coordination means receives information regarding water quality parameters controlled by said coordination means, said water quality parameters including iron and manganese concentrations, turbidity, and thickness of settled material, and activates one or more of processes i to v to adjust said water quality parameters within their limits:
  i. Applying oxidant agents to said water in said container to regulate iron and manganese concentrations in said water, wherein the oxidant agents are applied to said water in an amount sufficient to maintain and/or prevent the iron or manganese concentration from exceeding 1 ppm;
  ii. Applying coagulants, flocculants, or a mixture thereof to said water in said container to regulate the turbidity of said water, wherein the coagulants, flocculants, or mixture thereof are added to said water in an amount sufficient to prevent the turbidity of said water from exceeding 5 NTU;
  iii. Suctioning a portion of said water containing settled particles produced by process i and/or ii with a mobile suction means to regulate the thickness of the settled material so that the thickness of settled material does not exceed an average of 100 mm;
  iv. Filtering the portion of said water suctioned by the mobile suction means, with at least one filtration means; and
  v. Returning filtered water to said container; and
e. Utilizing said treated water in a downstream process, wherein said treated water is used:
  i. as a raw material for an industrial process and circulates in an open cycle; or
  ii. for discharging purposes, irrigation, infiltration, or a combination thereof.

2. The method according to claim 1, wherein the Langelier Saturation Index or Stiff & Davis Saturation index is kept under 2 by a process selected from pH adjustment, the addition of antiscalants, or a water softening process.

3. The method according to claim 2, wherein the antiscalants comprise phosphonic acid, PBTC (phosphobutan-tricarboxylic acid), chromates, zinc polyphosphates, nitrites, silicates, organic substances, caustic soda, malic acid-based polymers, sodium polyacrylate, ethylene diamine tetracetic acid sodium salts, benzotriazole, or a combination thereof.

4. The method according to claim 1, wherein the collected water can be a residual liquid from an industrial process or water collected from a natural water source and/or treated water.

5. The method according to claim 1, wherein the disinfectant agents comprise ozone, biguanide products, bromine based compounds, halogen based compounds, or a combination thereof.

6. The method according to claim 1, wherein the information received by said coordination means is obtained by empirical methods.

7. The method according to claim 1, wherein the oxidizing agents comprise halogen based compounds; permanganate salts; peroxides; ozone; sodium persulfate; potassium persulfate; oxidants produced by electrolytic methods, or a combination thereof.

8. The method according to claim 1, wherein the flocculant or coagulant agents comprise polymers, cationic polymers; anionic polymers; aluminum salts; quats and polyquats; calcium oxide; calcium hydroxide; ferrous sulphate; ferric chloride; polyacrylamide; sodium aluminate; sodium silicate; chitosan; gelatin; guar gum; alginates; moringa seeds; starch derivatives; or a combination thereof.

9. The method according to claim 1, further comprising dechlorinating said water in said container if residual chlorine is detected in said water, the dechlorinating step comprising an active carbon filter or chemicals comprising sodium bisulfite, sodium metabisulfite, or a combination thereof.

10. The method of claim 1, wherein said total ORP treatment time is discontinuous during the 7 day interval.

11. The method of claim 1, wherein:
  i. for water having a temperature up to 35 degrees Celsius (° C.), said total ORP treatment time comprises an approximate period of about 1 hour for each ° C. of water temperature;
  ii. for water having a temperature greater than 35° C. and less than 70° C., said total ORP treatment time comprises an approximate period of hours calculated by the following equation:

[35 hours]−[(Temperature of the water in degrees Celsius−35)×1 hour/° C.]=period of hours; or iii. for water having a temperature of 70° C. or more, said total ORP treatment time comprises an approximate period of about 1 hour.

\* \* \* \* \*